United States Patent Office 3,566,395
Patented Feb. 23, 1971

3,566,395
NON-LINEAR ANALOG-TO-DIGITAL CONVERTERS
Alec Harley Reeves, Harlow, Michael Beasley, Epping, Joseph Hood McNeilly, Harlow, and Roger Alan Manship, Bishop's Stortford, England, assignors to International Standard Electric Corporation, New York, N.Y., a corporation of Delaware
Filed Jan. 26, 1968, Ser. No. 700,873
Claims priority, application Great Britain, Feb. 3, 1967, 5,312/67
Int. Cl. H03k *13/02*
U.S. Cl. 340—347               9 Claims

ABSTRACT OF THE DISCLOSURE

A PAM sample shock excites a damped tuned circuit producing damped oscillations having an initial amplitude proportioned to the amplitude of a sample. A bistable device having a pair of time varying threshold levels produce an output each time the damped oscillations exceed the threshold levels. The resultant compressed digital version of the sample is produced by a binary counter coupled to the output of the bistable device.

BACKGROUND OF THE INVENTION

This invention relates to signal converters and more particularly to non-linear analog-to-digital converters.

The use of analog-to-digital converters employing non-linear companding techniques is well known. In particular, analog-to-digital converters using damped wave trains to achieve the non-linear characteristics are known. However, the such non-linear systems the compression and expansion processes follow a true logarithmic law which does not pass through the origin and is, therefore, to a large extent unacceptable.

An example of a converter using a logarithmic law is a PCM (pulse code modulation) coder consisting basically of a damped tuned circuit which is shock excited by a PAM (pulse amplitude modulation) sample to give a damped sine wave response having its initial amplitude proportional to the sample value. This damped wave train is then applied to a bistable detector device which gives a pulse output each time the applied signal exceeds a fixed threshold value. The resulting pulse train corresponds to a logarithmically compressed version in digital form of the PAM input. The PCM output is obtained by counting and serializing the pulse output from the detector.

SUMMARY OF THE INVENTION

An object of the present invention is to provide a non-linear analog-to-digital converter having a characteristic which is a modification of the fundamental logarithmic law to a given non-linear characteristic which passes through the origin.

A feature of the present invention is to provide a non-linear analog-to-digital converter comprising first means to provide successive pulse amplitude modulated samples of an analog signal, each of said samples being spaced by at least the coding period of said converter; second means coupled to the first means responsive to each of the samples to produce damped oscillations having a given characteristic; and third means coupled to the second means to produce a compressed digital version of each of the samples including fourth means coupled to the second means to produce an output each time the damped oscillations exceed a threshold value, and fifth means coupled to the fourth means to impart to the threshold value a given time varying characteristic.

In one embodiment of the invention the threshold value of the detector is continuously varying during the coding period. Such an embodiment can, for example, change the fundamental law from logarithmic to inverse sinh. The actual change achieved is of course dependent on the nature of the time varying threshold.

It is possible to have a time varying threshold such that the non-linear law is changed, for at least a portion of the characteristic, to a linear law. Moreover, the slope of the resulting linear characteristic depends on the particular portion of the non-linear characteristic of concern.

In a second embodiment of the invention, therefore, the threshold value of the detector varies discontinuously during the coding period. Such a discontinuous variation of the threshold value enables piecemeal linearization of a non-linear law.

BRIEF DESCRIPTION OF THE DRAWINGS

The above mentioned and other features and objects of this invention will become more apparent by reference to the following description taken in conjunction with the accompanying drawings, in which.

DESCRIPTION OF THE PREFERRED EMBODIMENTS

Figures 1, 2:
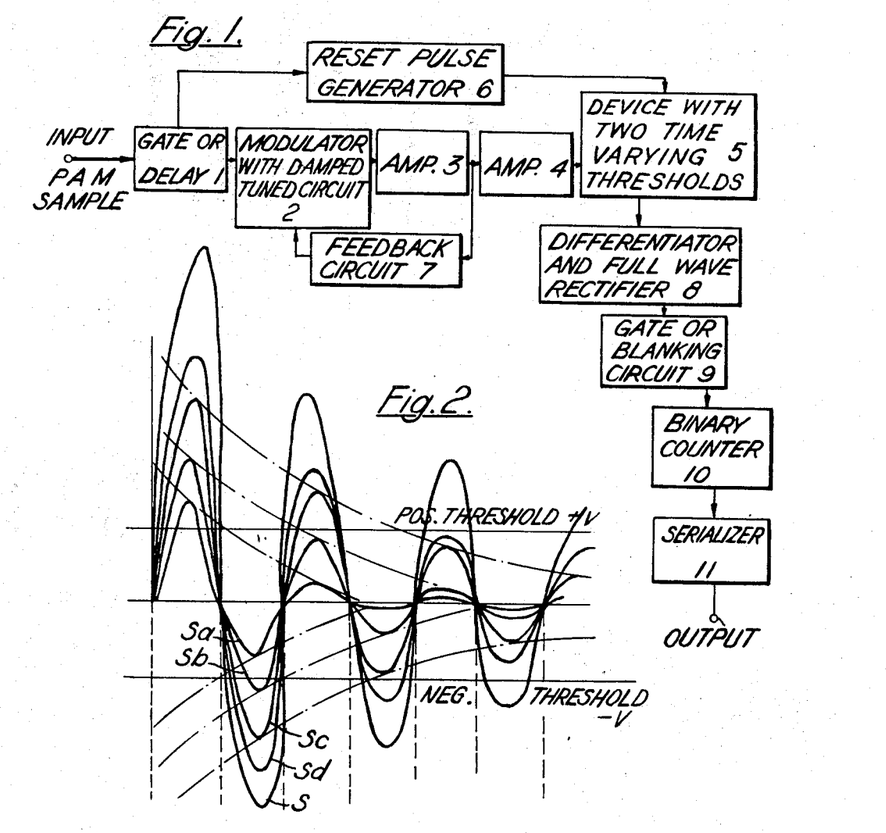
FIG. 1 is a block diagram of a PCM coder in accordance with the principles of this invention.
FIG. 2 illustrates the response to excitation by signals of different amplitudes of a tuned circuit having positive damping.

In the system illustrated in FIG. 1, an analog signal is sampled and a pulse amplitude modulated representation of said signal is applied to a gate or delay element 1 and also to the input of a reset pulse generator 6 whose output is applied to the reset input of a two-threshold detector device or bistable 5. The output of element 1 is applied to modulator 2 including a tuned circuit which is positively damped so that the amplitude of the response decays with time. The output of tuned circuit 2 is then applied to high impedance amplifier 3, such as a Darlington pair of a field-effect transistor, and the output of amplifier 3 is coupled to amplifier 4 which may be a limiting amplifier. The output of amplifier 4 is applied to one of the inputs of bistable 5, the other of whose inputs, which is used for resetting purposes, is supplied by the output of reset pulse generator 6. In order to maintain constant damping in the tuned circuit of modulator 2, feedback circuit 7 is provided.

The purpose of gate or delay element 1 is to allow reset pulse generator 6 sufficient time to decide on the polarity of the incoming PAM sample and to set the bistable to the appropriate state, e.g. assuming there is no phase change in the amplifier, a positive PAM sample will produce a damped sine wave with the first half-cycle positive-going, hence, bistable 5 should be set in the OFF state before the damped sine wave arrives. The sequence of operation is then as follows: the PAM sample arrives, reset pulse generator 6 decides if it is positive or negative and sends out the appropriate resetting pulse to bistable 5. Only then does gate or delay element 1 allow the PAM sample to reach modulator 2.

The output of bistable 5 is differentiated and rectified by device 8 and applied to gate or blanking circuit 9 whose output is fed into binary counter 10. Gate or blanking circuit 9 serves to suppress the reset pulses from the two-threshold device 5, which pulses might otherwise reach counter 10. The output of binary counter 10 is serialized by serializer 11 whose output thus provides a coded version of the original pulse amplitude modulated input signal coupled to element 1.

A guard space is necessary after each coding operation in order to prevent or minimize cross talk between adjacent channels. For example, if the PAM sample from one channel is maximal and that from the next channel is minimal then we must ensure that the tuned circuit response has decayed (after being shock excited by the first pulse) to a sufficiently low level that it does not appreciably effect the response due to the next channel pulse. If the guard space (i.e. the time between the end of one coding operation and the beginning of the next) is long enough, then either the signal decays to a safe level, or it is quenched by some means before the next channel pulse arrives.

FIG. 2 illustrates the response $S_a$, $S_b$, $S_c$, $S_d$, and $S$ of a tuned circuit having positive damping to different amplitude sample pulses.

FIGS. 3(a)–3(e) illustrate the differing response of a bistable device to each of the wave trains of FIG. 2. Curves (a), (b), (c), (d) and (e) are the responses, respectively, due to wave trains $S_a$, $S_b$, $S_c$, $S_d$ and $S$ of FIG. 2.

Figure 3:
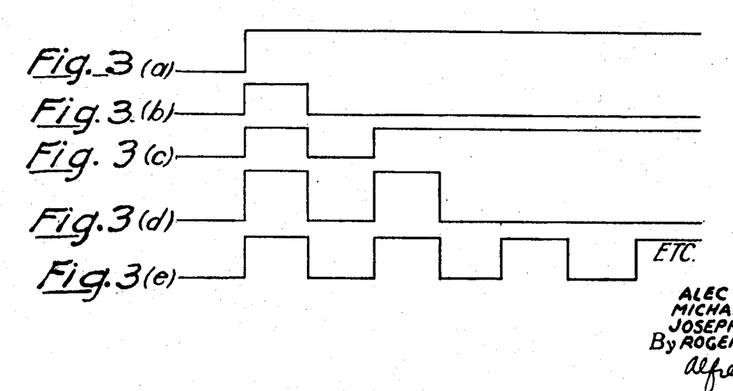
FIGS. 3(a)–3(e) illustrate the variation in the response of the bistable detector with variation in the amplitude of the damped sine wave.

In curve (a) the bistable switches ON due to the first positive and stays on.

In curve (b) the bistable comes ON due to the first positive and OFF due to the first negative and stays off.

In curve (c) the bistable comes ON and OFF due to the first cycle, comes ON due to the second positive and stays on.

In curve (d) the triggering continues one count longer, as the initial sample amplitude is greater.

In curve (e) the bistable continues to trigger for some time.

The voltage applied to the bistable is of the form $re^{-\alpha t} \sin wt$, where $e$ is the base of natural logarithms,
$\alpha$ is the damping factor of the tuned circuit,
$w$ is the resonant frequency of the tuned circuit,
$t$ is time measured positively from the instant $t=0$ when the modulator circuit (whose response is instantaneous) is excited, and
$r$ is the amplitude of the envelope of the damped wave train at time $t=0$ whose value depends, therefore, on the value of the PAM sample.

If $r_1$ corresponds to wave train $S_d$, $r_2$ to $S_c$, $t_3$ to $S_b$, and $r_4$ to $S_a$, and if the ON threshold of the bistable is set at a potential of $+v$ and the OFF threshold at a potential of $-v$, then curve (a) occurs when $$v = r_1 e^{-\frac{\alpha T}{4}}$$

curve (b) occurs when $$-v = -r_2 e^{-\frac{3\alpha T}{4}}$$

curve (c) occurs when $$v = r_3 e^{-\frac{5\alpha T}{4}}$$

curve (d) occurs when $$-v = -r_4 e^{-\frac{7\alpha T}{4}}$$

where T is the period of oscillation of the tuned circuit.

Hence, $$r_2 = r_1 e^{\frac{\alpha T}{2}}, \quad r_3 = r_2 e^{\frac{\alpha T}{2}}, \quad r_4 = r_3 e^{\frac{\alpha T}{2}}$$

etc.

It is clear that from this that in order to go from one condition of the bistable to the next, the applied signal must be increased by a factor of $e\alpha T/2$, giving a smooth companding law, where the term "companding law" is used with the sense given in Bernard Smith's article "Instantaneous Companding of Quantized Signals" in the Bell System Technical Journal for May 1957, pp. 653–709, viz. the law expressing the relationship of an output to an input signal in the compression stage of a system where the signal is subjected to non-uniform quantization. After transmission, the compressed signal requires subsequently to be expanded according to a law which is inverse to that of the compression stage.

The output from the bistable thus gives a compressed quantized version of the PAM sample in digital form. To convert this to PCM we need only to count the edges in the output from the bistable with a binary counter and then to serialize.

This result is achieved by the system outlined in FIG. 1. The reset pulses can be used to reset the bistable to the ON or OFF position depending on whether the succeeding PAM sample is positive or negative. We can, thus, achieve the same companding law for positive and negative PAM samples without having to rectify the signal at the sampling gate, providing the bistable is reset to the OFF condition for positive samples and to the ON condition for negative samples (assuming there is no phase change at the amplifier).

(I) Companding law of the logarithmic encoder

The companding law of the encoder described above is derived as follows: the law is given as the relationship between the normalized input voltage ($v1/V$) and the normalized effective output voltage ($v2/V$). The input voltage is considered to lie between $+V$ and $-V$. In order that the companding curve may be normalized it is considered that the output voltage also lies in this range. If there are a total of N codes then the voltage output axis between $+V$ and $-V$ is divided into $N/2$ equal steps. (N is here considered to be an even integer. This is a reasonable assumption because N will usually be a power of 2).

Thus, the points:

$$a_o, \; a_o e^{\frac{\alpha T}{2}}, \; a_o e^{\alpha T} \ldots a_o e^{(p-1)\frac{\alpha T}{2}} \ldots a_o e^{\left(\frac{N}{2}-1\right)\frac{\alpha T}{2}}$$

on the input axis will correspond to points $$\frac{V}{N-1}, \; \frac{3V}{N-1}, \; \frac{5V}{N-1} \ldots V$$

(The first decision level is represented by $V/N-1$ because the positive and negative axis $+V$ to $o$ and $o$ to $-V$ must each be divided into $$\frac{N}{2} - \frac{1}{2}$$

separate steps in order that there should not be a double step width at zero.)

The maximum positive end of the input axis is $$a_o e^{\left(\frac{N}{2}-1\right)\frac{\alpha T}{2}}$$

and for a normalized curve this will equal $+V$. Hence, setting $$a_o e^{\left(\frac{N}{2}-1\right)\frac{\alpha T}{2}} = V$$

gives $$a_o = V e^{-\left(\frac{N}{2}-1\right)\frac{\alpha T}{2}}$$

Putting $$v_1 = a_o e^{(p-1)\frac{\alpha T}{2}} = V e^{\left(p-\frac{N}{2}\right)\frac{\alpha T}{2}}$$

and $$v_2 = \frac{2p-1}{N-1} V$$

and equating values of $p$ from these two equations gives:

$$\frac{v_2}{V} = 1 + \frac{4}{(N-1)\alpha T} \log e \frac{v_1}{V}$$

or $$\log e \frac{v_1}{V} = \frac{\alpha T(N-1)}{4}\left(\frac{v_2}{V} - 1\right)$$

Figure 4:
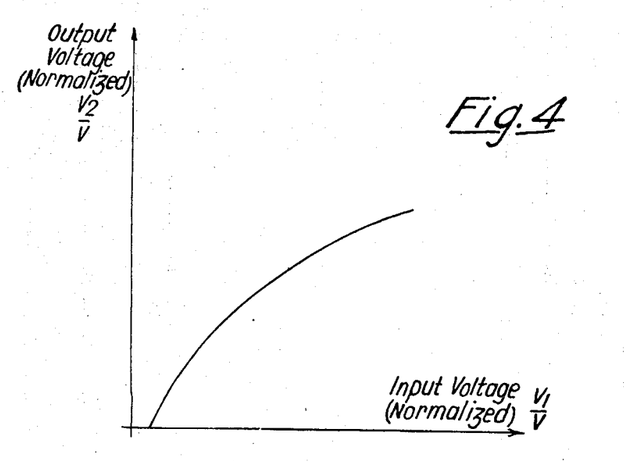
FIG. 4 is a graph illustrating the logarithmic companding law in a coder having a fixed detector threshold.

This is the companding characteristic in the first quadrant and is shown in FIG. 4. The complete characteristic would contain a corresponding curve drawn in the third quadrant.

The companding law can only be drawn from the last equation if $p$ is allowed to take non-integral values.

It will be noted that the logarithmic characteristic shown in FIG. 4 does not pass through the origin.

(II) Correction of decrement (c) by variation of threshold

It will now be shown in the encoder described above a correction may be applied to the decrement $\alpha$ by giving the threshold "$a$" a time variation. It is assumed that the uncorrected decrement of the sine wave is $\alpha$ and that a correction factor $\beta$ is required to be introduced so that the corrected decrement is $(\alpha - \beta)$.

Without correction, the $p$th transition level will be $$a_o e^{(p-1)\frac{\alpha T}{2}}$$

where $a_o$ is constant. If the decrement is required to appear as $(\alpha - \beta)$, then the $p$th transition level will be $$a_o e^{(p-1)\frac{(\alpha-\beta)T}{2}}$$

Thus, if the threshold is allowed to vary with time, then the decrement will appear to be $(\alpha - \beta)$ if $$ae^{(p-1)\frac{\alpha T}{2}} = a_o e^{(p-1)\frac{(\alpha-\beta)T}{2}}$$

i.e.

$$a = a_o e^{-(p-1)\frac{\beta T}{2}}$$

But the $p$th decision is made at a time $$t = \left(\frac{2p-1}{4}\right) T$$

Rearranging this equation gives:

$$p = 2\frac{t}{T} + \frac{1}{2}$$

Substituting this in the equation for "$a$" gives the threshold as a function of time. As in the derivation of the equation giving the logarithmic law above the function is only defined strictly for integral values of $p$. However, $p$ may be allowed to be continuously variable with no loss of generality and, hence, the equation defining $a(t)$ is $$a(t) = a_o e^{-\beta\left(t - \frac{T}{4}\right)}$$

(III) The inverse sinh coder

To obtain inverse sinh compression at the coder, the waveform to be applied to device 5 to time vary the threshold is simply that produced by charging a capacitor, i.e. of the form $K(1 - e^{-2\alpha t})$. The damped sine wave proportional to the PAM is applied to the detector and the output is effectively the time, in quantized form, required for the envelope of the damped oscillation to fall to the threshold level. Thus, for an initial value $v_1$ of the damped wave, the output $t_1$ is given by $$v_1 e^{-\alpha t_1} = K(1 - e^{-2\alpha t_1})$$

It is important to note that the time constant $(1/2\alpha)$ of the waveform varying the threshold is half that of the damped oscillation.

From this we get $$v_1 = 2K\left(\frac{e^{\alpha t_1} - e^{-\alpha t_1}}{2}\right)$$

i.e. $v_1 = 2K \sinh \alpha t_1$

Hence, $$t_1 = \frac{1}{\alpha} \sinh^{-1}\left(\frac{v_1}{2K}\right)$$

and since $v_2 = K_1 t_1$, it follows that the effective companding law is $$\frac{v_2}{K_1} = \frac{1}{\alpha} \sinh^{-1}\left(\frac{v_1}{2K}\right)$$

This is now the compression law for the coder.

The detector output is processed in the same way as in the original logarithmic coder to obtain the PCM output.

The maximum input amplitude is arranged to give maximum count and if we get one per cycle of the damped oscillation then we require a total coding time "T" equivalent to 64 periods to code maximum amplitude.

(IV) Detector circuit for inverse sinh coder

Figure 5:
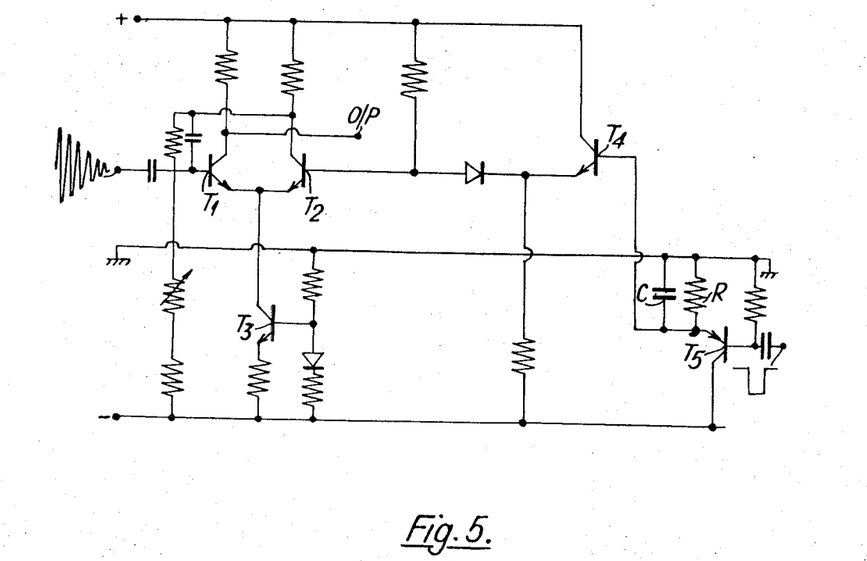
FIG. 5 is a circuit of device 5 of FIG. 1 suitable for a coder having an inverse sinh companding law in accordance with the principles of this invention.

To provide the coder of FIG. 1 with an inverse sinh compression law a detector circuit or device 5 such as that shown in FIG. 5 is used. This is basically a Schmitt trigger circuit.

Figures 6, 7:
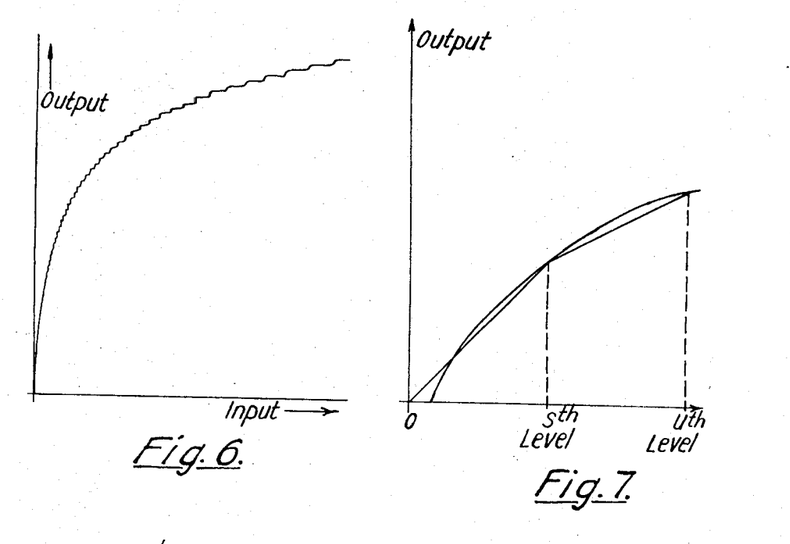
FIG. 6 is a graph illustrating the inverse sinh companding law due to the circuit of FIG. 5.
FIG. 7 is a graph illustrating the piecemeal linearization of a logarithmic companding law.

The damped sine wave is applied to the base of transistor $T_1$ and the output, a series of pulses, is taken from the collector of transistor $T_1$. The threshold of the trigger is controlled by the waveform applied at the base of transistor $T_3$ via the emitter follower including transistor $T_4$. This waveform is generated from the pulse response of the CR circuit in the emitter of transistor $T_5$. The time constant of this response is adjusted to half that of the envelope of the damped sine wave to obtain the $\sinh^{-1}$ compression law. The diodes in the circuit as used merely for temperature compensation. FIG. 6 shows the coder characteristic for positive inputs.

It will be noted that the characteristic passes through the origin in FIG. 6.

(V) Piecemeal linearization of the companding law

In its logarithmic form the encoder uses a damped sine wave $re^{-\alpha t} \sin wt$ which is fed into a bistable with thresholds of "$+a$" and "$-a$" (volts). The factor is made directly proportional to the amplitude of the PAM sample to be encoded and in this way the encoder automatically compresses the input signal. The output from the bistable is allowed to trigger a binary counter the output of which is the PCM signal required. However, some proposed companding laws consist of a number of linear segments and the logarithmic encoder can be modified so that it possess such a companding law. The modification is produced by allowing the bistable thresholds "$+a$" and "$-a$" to become functions of time "$+a(t)$" and "$-a(t)$". If only the positive peaks are counted, (with a Schmitt trigger) then there is only one threshold "$a$" which has to be allowed to become "$a(t)$."

It has been shown that the logarithmic coder has transition levels of $$a_o, a_o e^{\frac{\alpha T}{2}}, a_o e^{\alpha T} \ldots$$

etc.; this causes the first step to be of width $a_o$, the second $$a_o \left( e^{\frac{\alpha T}{2}} - 1 \right) \ldots$$

etc. where the first step is much larger than the second. It is clear, however, that if the number of transition levels is maintained constant but their position varied, then it is possible to produce a coder with a linear compression characteristic. However, it is necessary to linearize a certain minimum number ($s$) of steps in order to ensure that no step width is smaller than the preceding one.

The input signal to the encoder can have positive or negative polarity. Thus, a graph of input (voltage) signal against the effective output (voltage) signal will consist of a curve as shown in FIG. 7 in the first quadrant together with a corresponding curve in the third quadrant Thus, when the first $s$ positive and negative levels are linearized it follows that the steps from zero to first positive level and zero to first negative level should each be one half of the widths of the succeeding steps. If the first $s$ levels are linearized with a half width step at the origin then the condition that the $(s+1)$th step (not linearized) should be greater than or equal to the $s$th step is:

$$\frac{a_o e^{\frac{s-1}{2}\alpha T}}{s-\frac{1}{2}} \leq a_o e^{s\alpha T} - a_o e^{\frac{s-1}{2}\alpha T}$$

i.e.

$$s \geq e^{\frac{1}{\alpha T} + \frac{1}{2}} - 1$$

The minimum permissible values of $s$ are shown in Table 1 for various decrements per period.

TABLE 1

| Decrement per period, decibel | $e^{\frac{\alpha T}{2}}$ | $e^{\frac{1}{\frac{\alpha T}{2}}} - 1$ | $e^{\frac{1}{\frac{\alpha T}{2}} + \frac{1}{2}} - 1$ | Minimum $s$ |
|---|---|---|---|---|
| 1.5 | 1.000 | 11.11 | 11.61 | 12 |
| 1.6 | 1.097 | 10.31 | 10.81 | 11 |
| 1.7 | 1.103 | 9.709 | 10.2 | 11 |

(VI) Linearization of the first segment

The $s$th encoded level is decided at least by the time $$\frac{(2s-1)T}{4}$$

(This is the time of the appropriate maximum or minimum and at the transition level this value just equals the bistable threshold). The $q$th level will correspondingly be decided at or slightly before the time $$\frac{(2q-1)T}{4}$$

where $q$ is any integer such that $o q s$.

If the encoder just counts the $s$th level, then the parameter $r=r_s$ and $$r_s e^{\frac{-\alpha T(2s-1)}{4}} = a\left(t = \frac{(2s-1)T}{4}\right) = a_o$$

For this condition, the linearization of the first portion of the compression law will take the form shown in FIG. 7 in which the first $s$ levels are shown linearized.

If the $q$th level is to bear a linear relationship to the $s$th level, then $$\frac{r_q}{r_s} = \frac{q - \frac{1}{2}}{s - \frac{1}{2}}$$

Hence, $$r_q = \frac{q - \frac{1}{2}}{s - \frac{1}{2}} r_s$$

and $$\frac{q - \frac{1}{2}}{s - \frac{1}{2}} r_s e^{-\frac{\alpha T}{4}(2q-1)} = a\left(t = \frac{2q-1}{4}T\right)$$

But, $$r_s = a_o e^{\frac{\alpha T(2s-1)}{4}}$$

$$\frac{q - \frac{1}{2}}{s - \frac{1}{2}} a_o e^{\frac{\alpha T}{4}(2s-2q)} = a\left(t = \frac{2q-1}{4}T\right)$$

Allowing $q$ to take non-integral values allows $t$ to be made continuously variable. By making the substitution $$t = \frac{2q-1}{4}T$$

the function $a(t)$ is defined during the interval $$0 \leq t \leq \tau \text{ where } \tau = \frac{2s-1}{4}T$$

Making the substitution $$t = \frac{2q-1}{4}T$$

i.e., $$q = \frac{1}{2} + 2\frac{t}{T}$$

gives $$a(t) = \frac{2a_o}{T\left(s - \frac{1}{2}\right)} t e^{\frac{\alpha T}{4}(2s-1) - \alpha t}$$

where $$= X t e^{-\alpha t}$$

$$X = \frac{2a_o}{T\left(s - \frac{1}{2}\right)} e^{\frac{\alpha T}{4}(2s-1)}$$

The equation for $a(t)$ may be normalized in terms of $T$ to give $$a\left(\frac{t}{T}\right) = \frac{2a_o}{s - \frac{1}{2}} \frac{t}{T} e^{\frac{\alpha T}{4}\left(2s - 1 - \frac{4t}{T}\right)}$$

and normalizing with respect to $a_o$ gives $$\frac{a\left(\frac{t}{T}\right)}{a_o} = \frac{2}{s - \frac{1}{2}} \frac{t}{T} e^{\frac{\alpha T}{4}\left(2s - 1 - \frac{4t}{T}\right)}$$

The slope of this curve is:

$$\frac{d\frac{a\left(\frac{t}{T}\right)}{a_o}}{d(t/T)}=\frac{2}{s-\frac{1}{2}}e^{\frac{\alpha T}{4}\left(2s-1-\frac{4t}{T}\right)}-\alpha T\frac{t}{T}e^{\frac{\alpha T}{4}\left(2s-1-\frac{4t}{T}\right)}$$

$$=\frac{2}{s-\frac{1}{2}}\left(1-\alpha T\frac{t}{T}\right)e^{\frac{\alpha T}{4}\left(2s-1-\frac{4t}{T}\right)}$$

Thus, $$\frac{a\left(\frac{t}{T}\right)}{a_o}$$

has a maximum value at $$\frac{t}{T}=\frac{1}{\alpha T}$$

In Table 2 are shown the normalized times at which the maximum occurs, viz. $1/\alpha T$; this is given against the minimum value of $s$, the normalized time at which this minimum value is reached (i.e. $2s-1/4$) and the normalized time at which the count of 16 is reached. The count of 16 is thought to be of particular importance because in a 128 level encoder the first 16 levels on each side of zero are likely to be linear.

TABLE 2

| Decrement per period (db) | $\frac{1}{\alpha T}$ | Minimum $s$ | Time at which count for minimums occurs | Time at which count of 16 occurs |
|---|---|---|---|---|
| 1.5 | 5.780 | 12 | 5.25 | 7.75 |
| 1.6 | 5.400 | 11 | 4.75 | 7.75 |
| 1.7 | 5.100 | 11 | 4.75 | 7.75 |

(VII) Linearization of the second segment

It is considered here that the levels $s$ to $u$ are linearized according to the second portion of the curve shown in FIG. 7. The levels $o$ to $s$ all have equal steps and the levels $s$ to $u$ all have equal steps. It would be possible to produce a scheme whereby the $(s+1)$th step was the mean of the $o$ to $s$th step and the $(s+1)$th to $u$th step. The added complication that this would entail is thought not to be worthwhile.

It is assumed now that the threshold voltage "$a$" is made a function of time so that all the steps in the range $s$ to $u$ are of equal amplitude. Following the procedure above, the $p$th level is considered, where $p$ is an integer such that $s \leqslant p \leqslant u$.

The following relationships apply for $r_s$, $r_p$ and $r_u$ $$r_s e^{\frac{-\alpha T(2s-1)}{4}}=a\left(t=\frac{(2s-1)T}{4}\right)=a_o$$

$$r_p e^{\frac{-\alpha T(2p-1)}{4}}=a\left(t=\frac{(2p-1)T}{4}\right)$$

$$r_u e^{\frac{-\alpha T(2u-1)}{4}}=a\left(t=\frac{(2u-1)T}{4}\right)=a_o$$

Now if the levels between $s$ and $u$ are to be linear it follows that $$r_p = r_s + \frac{p-s}{u-s}(r_u - r_s) = \frac{u-p}{u-s}r_s + \frac{p-s}{u-s}r_u$$

$$=\left(\frac{u-p}{u-s}\right)a_o e^{\frac{\alpha T(2s-1)}{4}} \pm \left(\frac{p-s}{u-s}\right)a_o e^{\frac{\alpha T(2u-1)}{4}}$$

$$a\left(t=\frac{(2p-1)T}{4}\right)=\left(\frac{u-p}{u-s}\right)a_o e^{\frac{\alpha T(s-p)}{2}}$$

$$+\left(\frac{p-s}{u-s}\right)a_o e^{\frac{\alpha T(u-p)}{2}}$$

Now $$\frac{(2p-1)T}{4}=t$$

can be re-arranged to give $$p=2\frac{t}{T}+\frac{1}{2}$$

Thus, if $p$ is now allowed to take non-integral values $a(t)$ can be found by making this substitution as:

$$a(t)=a_o e^{-\frac{\alpha T s}{2}}\left[ue^{\frac{\alpha T s}{2}}-se^{\frac{\alpha T u}{2}}\right.$$

$$\left.+\left(e^{\frac{\alpha T u}{2}}-e^{\frac{\alpha T s}{2}}\right)\left(2\frac{t}{T}+\frac{1}{2}\right)\right]e^{-\alpha t}$$

where $$\frac{(2s-1)T}{4} \leqslant t \leqslant \frac{(2u-1)T}{4}$$

(VIII) Detector thresholds for the first two segments

Figure 8:
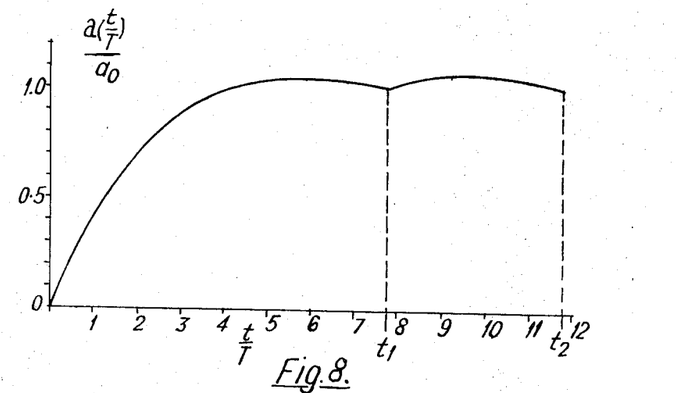
FIG. 8 is a graph illustrating the time varying threshold values of device 5 of FIG. 1 required for linearization of the first two segments of the logarithmic companding law as shown in FIG. 7.

A plot of $$\frac{a\left(\frac{t}{T}\right)}{a_o}$$

for the first two segments ($o$ to $s$ and $s$ to $u$) is shown in FIG. 8 for a decrement of 1.505 db/period, $s=16$ and $u=24$. The first segment is linearized in the normalized time $o$ to $t_1$ and the second in $t_1$ to $t_2$. The relevant calculations are shown in Tables 3 and 4.

$$\frac{a\left(\frac{t}{T}\right)}{a_0}=\frac{2}{s-\frac{1}{2}}\frac{t}{T}e^{\frac{\alpha T}{4}\left(2s-1-4\frac{t}{T}\right)}$$

TABLE 3

| $\frac{t}{T}$ | $s$ | $\frac{a\left(\frac{t}{T}\right)}{a_o}$ | Decrement |
|---|---|---|---|
| 0.25 | 16 | 0.1183 | 1.505 db/period. |
| 0.75 | 16 | 0.3255 | Do. |
| 1.25 | 16 | 0.4974 | Do. |
| 1.75 | 16 | 0.6386 | Do. |
| 2.25 | 16 | 0.7529 | Do. |
| 2.75 | 16 | 0.8439 | Do. |
| 3.25 | 16 | 0.9145 | Do. |
| 3.75 | 16 | 0.9677 | Do. |
| 4.25 | 16 | 1.0057 | Do. |
| 4.75 | 16 | 1.0307 | Do. |
| 5.25 | 16 | 1.0447 | Do. |
| 5.75 | 16 | 1.0492 | Do. |
| 6.25 | 16 | 1.0458 | Do. |
| 6.75 | 16 | 1.0357 | Do. |
| 7.25 | 16 | 1.0201 | Do. |
| 7.75 | 16 | 1.0000 | Do. |

$$\frac{a\left(\frac{t}{T}\right)}{a_o}=\frac{e^{-\frac{\alpha T}{4}}}{u-s}\left[ue^{\frac{\alpha T s}{2}}-se^{\frac{\alpha T u}{2}}+\left(e^{\frac{\alpha T u}{2}}-e^{\frac{\alpha T s}{2}}\right)\right.$$

$$\left.\left(2\frac{T}{t}+\frac{1}{2}\right)\right]e^{-\alpha T\frac{t}{T}}$$

TABLE 4

| $\frac{t}{T}$ | $s$ | $u$ | $\frac{a\left(\frac{t}{T}\right)}{a_o}$ | Decrement |
|---|---|---|---|---|
| 8.25 | 16 | 24 | 1.0316 | 1.505 db/period. |
| 8.75 | 16 | 24 | 1.0511 | Do. |
| 9.25 | 16 | 24 | 1.0603 | Do. |
| 9.75 | 16 | 24 | 1.0606 | Do. |
| 10.25 | 16 | 24 | 1.0537 | Do. |
| 10.75 | 16 | 24 | 1.0405 | Do. |
| 11.25 | 16 | 24 | 1.0223 | Do. |
| 11.75 | 16 | 24 | 1.0000 | Do. |

(IX) Linearization of subsequent segments

The function $$\frac{a\left(\frac{t}{T}\right)}{a_0}$$

needed for linearization of the second segment has been quoted above. Since $u$ and $s$ are chosen arbitrarily, it follows that this equation will provide for the linearization of any segment between any two decision levels $s$ and $u$ which lie on the original companding curve.

If equal numbers of decision levels are included in each segment then the linearizing waveform is repetitive. This can be shown by replacing $$\frac{t}{T} \text{ by } \left(\frac{t}{T}+s\right)$$

in the above equation. The timing of the waveform starts with $$\frac{t}{T}=0$$

at the beginning of the segment. The equation then becomes:

$$\frac{a\left(\frac{t}{T}\right)}{a_0}=\frac{e^{-\alpha t}}{s-u}\left[s-u+\left(e^{\frac{\alpha T(s-u)}{2}}-1\right)\left(2\frac{t}{T}+\frac{1}{2}\right)\right]e^{-\alpha T \frac{t}{T}}$$

Since the equation is a function of $(s-u)$ and not of $s$ or $u$ separately, it follows that this waveform is the same for all segments having the same value of $s-u$.

(X) Detector circuit for linearized coder

Figure 9:
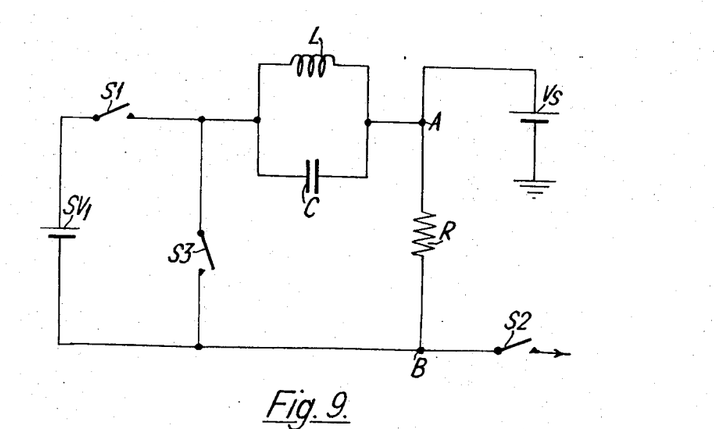
FIGS. 9 and 10 are circuits used for developing threshold controlling waveforms for device 5 in the coder of FIG. 1 having a linearized logarithmic companding law.

The detector circuit for the linearized logarithmic coder is based on a Schmitt trigger, as in FIG. 5, but the threshold controlling waveform applied to the base of transistor $T_2$ is derived from the circuit of FIG. 9. At the start of the coding period switches $S_1$ and $S_2$ are closed and the critically damped LCR circuit is excited by the voltage source $SV_1$, where $SV_1$ is numerically equal to $V_s$. Referring to the previous equation $$\frac{a\left(\frac{t}{T}\right)}{a_0}=\frac{2}{s-\frac{1}{2}}\frac{t}{T}e^{\frac{\alpha T}{4}\left(2s-1-\frac{4t}{T}\right)}$$

$$\frac{a\left(\frac{t}{T}\right)}{a_0}=Xte^{Y-\alpha t}$$

(where X, Y are constants) and then substituting U in the equation we get $$\frac{a\left(\frac{t}{T}\right)}{a_0}=Ute^{-\alpha t}$$

(where $U=Xe^Y$ is a constant).

When the circuit is critically damped, i.e.

$$\frac{1}{LC}=\frac{1}{4R^2C^2}$$

the current $$i=\frac{V_s}{R}[1-2\bar{\alpha}te^{-\bar{\alpha}t}]$$

where $$\alpha=\frac{1}{2CR}$$

Therefore, the voltage $V_{AB}$ across resistor R is $$V_{AB}=iR=V_s[1-2\alpha te^{-\alpha t}]=-V_{BA}$$

So $$V_{BA}=V_s[2\alpha te^{-\alpha t}-1]$$

and $$V_B \text{ (ground)}=V_s[2\bar{\alpha}te^{-\bar{\alpha}t}-1]+V_s=2V_s\bar{\alpha}te^{-\bar{\alpha}t}$$

Thus, the voltage $V_B$ at point B is fed to vary the threshold of device 5 via switch $S_2$. It is necessary to make $$2V_s\bar{\alpha}=U=\frac{2}{\left(s-\frac{1}{2}\right)T}e^{\frac{\alpha T}{4}(2s-1)}$$

and $\bar{\alpha}=\alpha$. So, for a given, T, s, $$\bar{\alpha}=\alpha=\frac{1}{2CR}$$

$$L=4R^2C$$

$$V_s=\left(s-\frac{1}{2}\right)\alpha Te^{\frac{\alpha T}{4}(2s-1)}$$

When the point is reached where the first linear segment is replaced by the second segment, i.e. at level $s$, switch $S_2$ is opened to isolate the circuit from the detector bistable of device 5, and subsequently $S_1$ is opened and $S_3$ is closed to reset the circuit in preparation for the next coding period. Finally $S_3$ is opened and the circuit is ready for the next coding operation.

Figure 10:
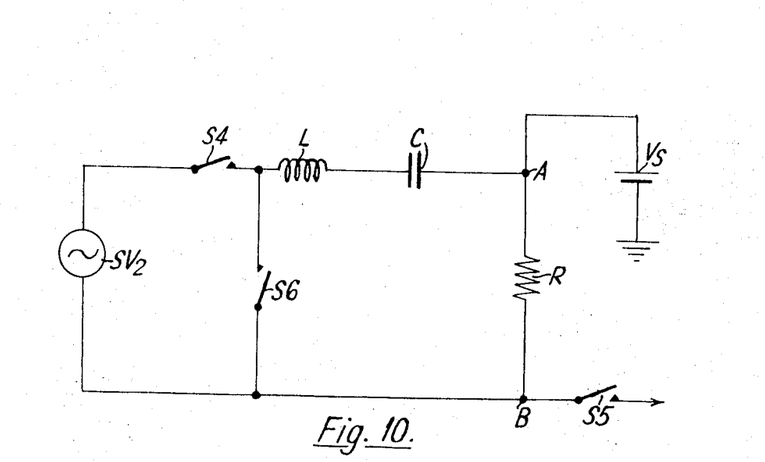

At the same time as $S_2$ is opened to isolate the circuit of FIG. 9, when level $s$ is reached, switches $S_4$ and $S_5$ of the circuit of FIG. 10 are closed to create and supply the threshold controlling waveform for the second linear segment. Referring to the previous equation $$a(t)=\frac{a_0 e}{u-s}\cdot\frac{\alpha T}{4}\left[ue^{\frac{\alpha Ts}{2}}-se^{\frac{\alpha Tu}{2}}+(e^{\frac{\alpha Tu}{2}}-e^{\frac{\alpha Ts}{2}})\left(2\frac{t}{T}+\frac{1}{2}\right)\right]e^{-\alpha t}$$

which is the form of $$\frac{a(t)}{a_0}=(X+Yt)e^{-\alpha t}$$

(where X and Y are constants and are intrinsically positive).

The voltage source $SV_2$ in the case of FIG. 10 is obtained by superimposing a ramp $At$ on a fixed voltage $V_r$ giving $(V_r+At)$ Then $$Li=\frac{1}{L_s+R+\frac{1}{SC}}L(Vr+At)$$

$$=\frac{1}{L_s+R+\frac{1}{SC}}\left(\frac{V_r}{s}+\frac{A}{s^2}\right)$$

$$=\frac{A+Vrs}{Ls(+\alpha)^2}$$

Therefore, $$i=L^{-1}\frac{A+Vrs}{sL(s+\alpha)^2}=L^{-1}\left[\frac{\frac{A}{L\alpha^2}}{s}+\frac{\frac{V_r\alpha-A}{\alpha}}{(s+\alpha)^2}-\frac{\frac{A}{L\alpha^2}}{s+\alpha}\right]$$

$$=\left[\frac{A}{L\alpha^2}-\frac{1}{L}\left(\frac{A}{\alpha}-V_r\right)te^{-\alpha t}-\frac{A}{L\alpha^2}e^{\alpha t}\right]$$

Hence, as above $$=\left[R\frac{A}{L\alpha^2}+\frac{1}{L}\left(\frac{A}{\alpha}-V_r\right)t\right]e^{-\alpha t}$$

which gives the correct waveform if $$X=\frac{RA}{L\alpha^2}$$

$$Y=\frac{R}{L}\left(\frac{A}{\alpha}-V_r\right)$$

Again, as in FIG. 9, isolating and resetting operations are effected by operating switches $S_4$, $S_5$ and $S_6$ when the $u$th level is reached.

The third and subsequent linear segments utilize circuits similar to that of FIG. 10.

While we have described above the principles of our invention in connection with specific apparatus, it is to be clearly understood that this description is made only by way of example and not as a limitation to the scope of our invention as set forth in the objects thereof and in the accompanying claims.

We claim:
1. A non-linear analog-to-digital converter comprising:
   first means to provide successive pulse amplitude modulated samples of an analog signal, each of said samples being spaced by at least the coding period of said converter;
   second means coupled to said first means responsive to each of said samples to produce damped oscillations having a given characteristic; and
   third means coupled to said second means to produce a compressed digital version of each of said samples having a non-linear compression characteristic different than a logarithmic characteristic including
      fourth means coupled to said second means to produce an output signal each time said damped oscillations exceed a threshold value,
      fifth means coupled to said fourth means to impart to said threshold value a given continuous time versus amplitude characteristic varying according to at least one mathematical law during said coding period to provide in cooperation with said damped oscillation said nonlinear compression characteristic, and
      binary counting means coupled to said fourth means to produce said compressed digital version of each of said samples in response to said output signal.

2. A converter according to claim 1, wherein said fifth means includes
   a capacitor coupled to said fourth means, and
   means coupled to said capacitor to charge said capacitor during said coding period the ratio of charging said capacitor providing said continuously varying time versus amplitude characteristic.

3. A converter according to claim 2, wherein said fourth means includes
   a Schmitt trigger circuit having two inputs, one input being coupled to said second means and the other input being coupled to said capacitor.

4. A converter according to claim 3, wherein the non-linear compression characteristic of said compressed version is an inverse sinh characteristic.

5. A converter according to claim 1, wherein the non-linear compression characteristic of said compressed version is an inverse sinh characteristic.

6. A converter according to claim 1, wherein said given time versus amplitude characteristic varies according to at least two different mathematical laws during said coding period.

7. A converter according to claim 1, wherein said fifth means includes
   sixth means coupled to said fourth means to vary said given time versus amplitude characteristic for a first portion of said coding period according to a first mathematical law, and
   seventh means coupled to said fourth means to vary said given time versus amplitude characteristic during subsequent portions of said coding period according to successively different mathematical laws.

8. A converter according to claim 7, wherein said sixth means includes
   a critically damped tuned circuit coupled to said fourth means, and
   a fixed voltage source coupled to said circuit for excitation thereof.

9. A converter according to claim 7, wherein said seventh means includes
   a critically damped tuned circuit coupled to said fourth means, and
   a source of a ramp voltage superimposed on a fixed voltage coupled to said circuit for excitation thereof.

References Cited

UNITED STATES PATENTS

| | | | |
|---|---|---|---|
| 2,999,925 | 9/1961 | Thomas | 328—171X |
| 3,206,741 | 9/1965 | Kreyer | 340—347 |
| 3,214,694 | 10/1965 | Hickey et al. | 328—169X |
| 3,314,062 | 4/1967 | Pommerening | 340—347 |
| 3,351,930 | 11/1967 | Zweig | 340—347 |
| 3,437,835 | 4/1969 | Mimken et al. | 328—151X |

MAYNARD R. WILBUR, Primary Examiner

M. K. WOLENSKY, Assistant Examiner